(12) United States Patent
Mock et al.

(10) Patent No.: US 8,726,026 B2
(45) Date of Patent: May 13, 2014

(54) END-TO-END ENCRYPTION METHOD AND SYSTEM FOR EMAILS

(75) Inventors: Marcel Mock, Zumikon (CH); Olivier Swedor, Zurich (CH)

(73) Assignee: Totemo AG, Kushnacht (CH)

( * ) Notice: Subject to any disclaimer, the term of this patent is extended or adjusted under 35 U.S.C. 154(b) by 1888 days.

(21) Appl. No.: 10/991,678

(22) Filed: Nov. 18, 2004

(65) Prior Publication Data

US 2005/0114652 A1 May 26, 2005

(30) Foreign Application Priority Data

Nov. 26, 2003 (EP) ..................................... 03104388

(51) Int. Cl.
*H04L 29/06* (2006.01)
(52) U.S. Cl.
USPC .......................................................... 713/175
(58) Field of Classification Search
USPC .......................................................... 713/175
See application file for complete search history.

(56) References Cited

U.S. PATENT DOCUMENTS

| | | | |
|---|---|---|---|
| 5,935,212 A * | 8/1999 | Kalajan et al. ................ 709/228 |
| 6,009,103 A * | 12/1999 | Woundy ......................... 370/401 |
| 6,092,201 A * | 7/2000 | Turnbull et al. ................... 726/4 |
| 6,584,564 B2 | 6/2003 | Olkin et al. |
| 6,609,196 B1 | 8/2003 | Dickinson et al. |
| 7,093,121 B2 * | 8/2006 | Barton et al. ................. 713/150 |
| 2001/0002472 A1* | 5/2001 | Kanai et al. .................. 709/217 |
| 2001/0049786 A1* | 12/2001 | Harrison et al. .............. 713/156 |
| 2002/0059529 A1* | 5/2002 | Beton et al. .................. 713/201 |
| 2002/0165912 A1* | 11/2002 | Wenocur et al. .............. 709/203 |
| 2003/0084331 A1* | 5/2003 | Dixon et al. .................. 713/200 |
| 2005/0149442 A1* | 7/2005 | Adams et al. .................. 705/51 |

FOREIGN PATENT DOCUMENTS

WO    WO 9905814 A2 *  2/1999

\* cited by examiner

*Primary Examiner* — Yogesh Paliwal
(74) *Attorney, Agent, or Firm* — Pearne & Gordon LLP (57) ABSTRACT

An end-to-end encryption method for emails sent from a sender (1) to a recipient (6) is disclosed. According to the method, the sender requests from an encryption system (16) a certificate corresponding to the recipient (6), and the encryption system (16) returns to the sender (11) a first, proforma certificate corresponding to the recipient (6). The sender (1) sends with his email client (11) an outgoing email to the recipient encrypted with the proforma certificate, and the email is forwarded through the encryption system (16). The encryption system (16) decrypts the email using a private key corresponding to the certificate and also makes the content of the email available to the recipient (6).

38 Claims, 8 Drawing Sheets

END-TO-END ENCRYPTION METHOD AND SYSTEM FOR EMAILS

REFERENCE DATA

This application in the USA claims priority of Swiss patent application 2003EP-104388 filed on Nov. 26, 2003, the contents whereof are hereby incorporated.

FIELD OF THE INVENTION

The present invention relates to an encryption method for emails sent from a sender to a recipient, and to an encryption system. The present invention also relates to an end-to-end encryption method and system. The present invention also relates to the protection of emails between an email client and an encryption system within the same private network, for example within the same local area network or between an Internet service provider and a client.

DESCRIPTION OF RELATED ART

Figure 1:
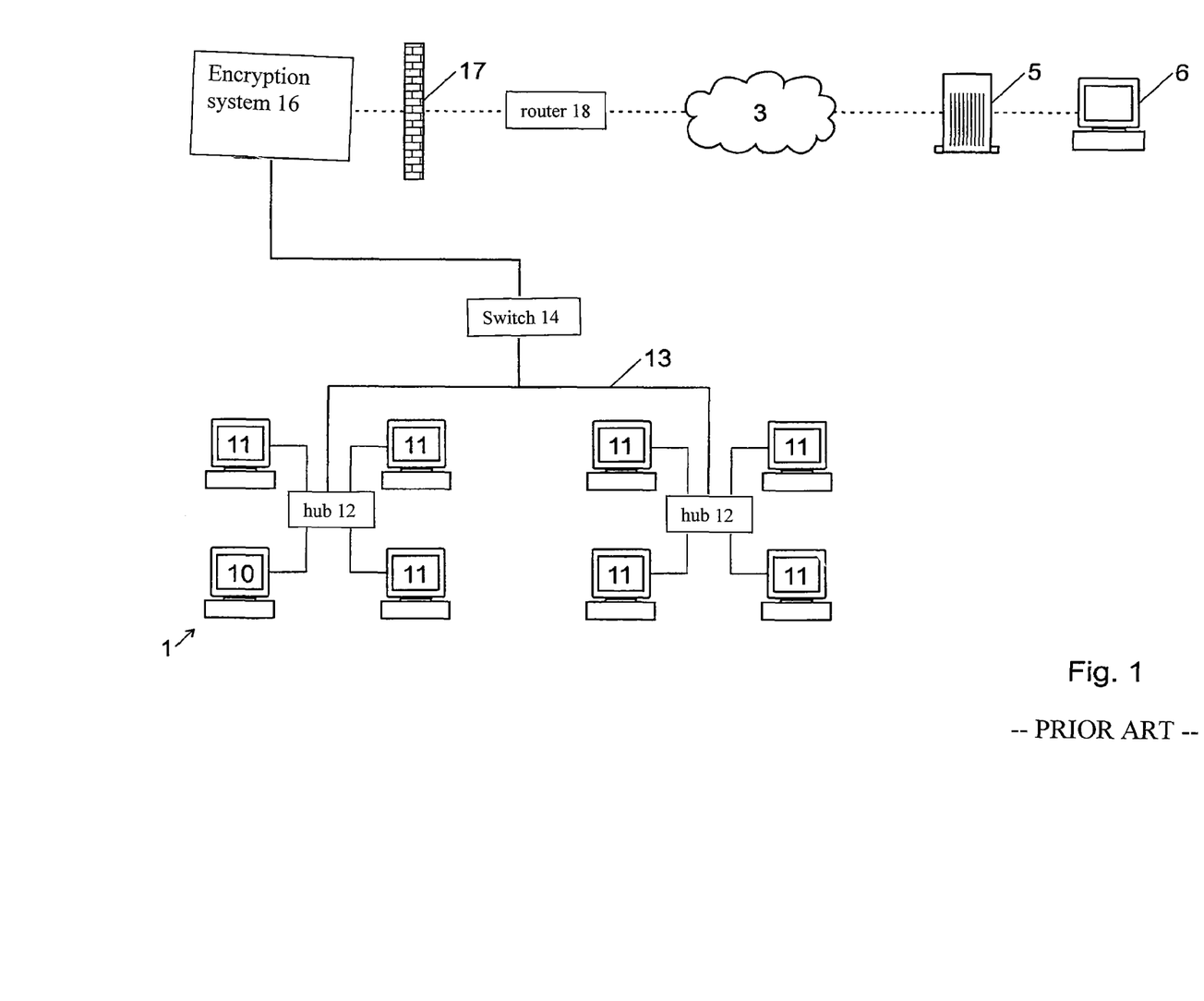
FIG. 1 is a schematic representation of a prior art network with a server-side encryption solution.

Server-side solutions to protect the confidentiality of emails as they travel the Internet on their way to their intended recipient are already known. An example of such a solution is offered, among others, by the applicant under the commercial name Trustmail. With such a solution, the encryption of the email occurs only once the outgoing email has reached the encryption system 16 (usually just before it leaves the sender company's private network 13), as is shown in FIG. 1.

In this figure, an email server including an encryption system 16 is installed within the sender company's private network 13 and directly connected to a firewall 17. The company private network 13 comprises a plurality of email clients 10, 11 mutually connected with hubs 12 and/or switches 14. Reference 10 designates the email client of sender 1. Encrypted emails that leave the firewall 17 are forwarded by a router 18 through the Internet 3 and received by an email server 5 in the network of the recipient 6. The dashed line shows the protected (encrypted) portion of the email path.

This situation offers much better security than the conventional one where emails travel the Internet 3 with no protection. The encryption server 16 is responsible for generating, collecting and distributing encryption certificates, for insuring that no confidential email leaves the company private network 13 unprotected, and offers a great comfort to users within the company.

However, in this prior art solution, emails are basically unprotected until they are processed by the encryption system in the email server 16. This problem is common to all email security solutions that encrypt emails centrally on a server.

Unlike when it travels the Internet, the email is not, or at least should not be, accessible to outside attackers on the private network part of its journey. But it is accessible to any employee quite easily, and also to an attacker who would be able to break into the network 13 and install a packet sniffer. First, it can be intercepted on any computer or network device it crosses on its way to the secure email server 16. Second, and even more easily, if multiple computers are connected to the network via hubs 12 like on the example on FIG. 1, anybody can read all emails sent by all the clients connected to the same hub. This is because most private networks are based on protocols like for example Ethernet and TCP-IP, in which everything is sent to everybody. All computers listen permanently for all data packets, for example Ethernet frames, but are supposed to only process those addressed to them, discarding the others. This means that when a computer on FIG. 1 sends an email, computers connected to the same hub 12 receive it as well as the switch. The user of one of these three computers just has to install a little "sniffer" software to access all the traffic originating from or sent to the three other computers connected to the same hub as him. Even if switches are used instead of hubs, there can still be ways for attackers to sniff traffic on the LAN.

Thus no comprehensive security is achieved without encrypting emails already in the internal employee email clients. Installing recipients' certificates is however cumbersome and for many inexperienced users too complicated or time-consuming. Moreover, this process is only possible if the recipient is actually able to provide a certificate. That means that the sender has to first request a certificate for the recipient (if nobody from his company has done it before and centrally stored the certificate), and wait for the recipient to react. Before that, nothing can be sent. Furthermore, the recipient must support the same encryption technique as the sender. A sender wishing to send encrypted emails to many recipients may have to install a lot of different encryption softwares or plug-ins.

Furthermore, if the certificates are not centrally stored, when many users within a company send emails to a same recipient, the process has to be repeated by each user who has to require a certificate from the recipient, which is time consuming both for the sender and for the recipient. This makes the process of encrypting an email for a new recipient whose certificate is not yet in the address book used by the sender difficult: a setup phase to obtain the recipient's certificate (assuming he has one) and add it to the address book is needed before any secure communication can happen. Storing the recipient's certificates in each sender email client furthermore necessitates supplementary backup precautions.

Even worse, this solution makes it impossible to scan at a central place in the local area network 13 the emails for viruses or to enforce any content-checking on them, since they are encrypted. This means a significant loss of control for the company on what is sent to or received by its users, be it offensive content, confidential content, viruses, etc.

In addition, end-to-end encryption methods do not allow delegation rules in the company email server to be defined anymore. Delegation allows to make a user or group of users receive emails originally destined to somebody else. Since the emails are encrypted with the certificate of the original recipient, the user or group of users to which the email is delegated will not be able to decrypt it.

Several solutions are known in the prior art for encrypting emails within a local area network. However, many existing solutions are only able to encrypt internal emails, that is, emails sent to a recipient within the same network. Other possible solutions request the installation of a plug-in on the email clients 11 of each user, which encrypts outgoing emails with a certificate of the LAN's email server 16 instead of encrypting them with certificates corresponding to the end recipient's email address. Developing and installing plug-ins is however expensive, especially if different types of email clients 11 are used.

Still another possibility is to change the users' way of sending emails. One way of encrypting emails for the secure server 16 without installing plug-ins would be for the users to send all emails to a special email address (for example the address of the secure server), and to put the real recipient's address in the email subject field. Another thinkable option is to try to make the communication between the secure email server 16 and the email clients happen over an SSL connection, but depending on the architecture of the network and the email server used, this option might not be possible. It is also resource-intensive to build an SSL connection every time, especially since normal email clients automatically check periodically the arrival of new emails.

It is therefore an aim of the present invention to provide a more secure encrypted email communication between the user's email clients and a central encryption system 16 in the network, preferably without installing plug-ins, without building SSL connections, and without changing much the way users send emails.

Another aim of the invention is to provide an encryption system and method for encrypting emails between the user's email clients and the user's company email server.

Another aim of the invention is to make it possible to delegate emails to other users, whereas the method and system of the invention must ensure security of the emails between the email server that performs the delegation task and the new recipient.

Another aim of the invention is to provide an end-to-end encryption system and method for encrypting emails on the full path between the user's email client 11 and the recipient email server 5 or client 6, without jeopardizing the possibility of performing a security check on the content or attachments of the email in a central appliance in the user's company network 13.

Another aim of the invention is to provide an improved email encryption system and method that prevents the above mentioned problems of the prior art or related solutions.

BRIEF SUMMARY OF THE INVENTION

According to the invention, those problems are solved, among others, by an encryption method for emails sent from a sender to a recipient, comprising the following steps:
the sender requests from an encryption system a certificate corresponding to said recipient,
the encryption system returns to said sender a first, proforma certificate corresponding to said recipient,
the sender sends with his email client an outgoing email to said recipient encrypted with said proforma certificate,
said email is forwarded through said encryption system,
said encryption system decrypts said email using a private key corresponding to said certificate,
said encryption system makes the content of said email available to said recipient.

This has the advantage, among others, that the email is encrypted between the sender's email client and the encryption system, but can be decrypted by this system using the private key corresponding to the proforma certificate delivered by the system to the sender. The encryption system can thus perform various security tasks on the outgoing email, such as virus and offensive content detection.

This also has the advantage that emails can be sent in a normal way, as the sender does not necessarily know that the certificate used does not correspond to the intended recipient, but to the internal encryption system. Thus the encryption can be performed with the security facilities, such as S/MIME, available in most email clients, without installing any new plug-ins or software in the user's equipment.

This also has the advantage that the whole setup process, including the generation of key pairs and their installation in the email clients, is performed or at least assisted by the encryption system. Furthermore, a central directory of recipients' addresses and certificates can easily be installed or made accessible to the encryption system.

The present invention thus also relates to a new type of secure email gateway that not only encrypts the outgoing emails between itself and the external recipient like for typical email encryption gateways but also between the internal sender and the encryption system. This is preferably achieved without installing any plug-ins on the internal email clients, without any significant change to the senders' habits and without loss of control over the content for the company using the system (like in the case of end-to-end encryption). The goal is to have as many of the respective advantages of both server-side and end-to-end types of encryption as possible.

BRIEF DESCRIPTION OF THE DRAWINGS

These and other advantages will be better understood with the description of several embodiments illustrated by the enclosed figures in which.

DETAILED DESCRIPTION OF THE INVENTION

In the following section of the description and in the claims, when we talk about a "private network", it can be a local area network (LAN), a plurality of mutually connected local area networks, a VPN (virtual private network), or a plurality of mutually connected LANs and/or VPNs and/or WLANs. Thus, parts of the network may be public; a feature of the private network is however that it must be possible to install in the network an encryption system which will be able to decrypt secure emails; a relationship of trust must therefore exist between all users of the private network and the administrator of the trusted encryption system. In most embodiments, the private network has an administrator that also administrates the encryption system.

When we say "certificate" or "public key", we mean the same, except when specifically stated. To encrypt data using symmetric and/or asymmetric encryption, the public key of the recipient of the data is needed. A certificate is simply a public key with some information attached. Different technologies use different terminology, with S/MIME the word certificate is usually preferred and with PGP the term public key.

When we say "encryption system", we mean not only the software and/or hardware module that actually performs encryption, but a complete server system for processing and encrypting emails. Depending on the embodiment, the encryption system can for example include an encryption gateway, an email relay or an email server, an address directory, a directory proxy, etc. Those different components of the encryption system may be implemented by one or several software modules and one or several hardware modules, for example one server, one Internet security appliance, or a group of mutually connected servers.

We usually use the term encryption gateway, or secure gateway, to designate the part of the encryption system that actually generates and delivers certificates, decrypts and encrypts incoming and outgoing emails, etc. The secure email gateway may be implemented by one or several modules running on one or several servers. The administrator of the encryption gateway is trusted by all users within the private network.

"Internal users" are users inside the private network where the system is installed, for example the employees of the company using the system, users connected to a common local area network or group of local area networks, or clients of an Internet Service Provider or of a value-added service provider using the system.

When we talk about encryption, it can be any symmetric and/or preferably asymmetric encryption technology (for example S/MIME, PGP, etc.), in which emails are encrypted by the recipient certificate and decrypted by the corresponding private key. Emails may also be signed with the sender's private key, thus allowing recipients to check the authenticity of the message with the corresponding certificate.

When we say "directory", we mean a directory or database preferably running on a server within the private network and containing user information, for example user email addresses and certificates. Any kind of protocol or language can be used to access it (LDAP, SQL, etc.).

When we say email, we mean conventional SMTP emails as well as equivalents such as instant messages or other digital messages which can be sent and received with message clients running on user computers.

The present description focuses on the processing of outgoing emails and on solving the problem of protecting emails sent to new recipients for whom no certificate is available. However, the encryption system of the invention can also be used for processing incoming emails. The encryption system of the invention may for example decrypt incoming emails, check their signature, perform virus and content check, re-encrypt the emails with the internal recipient certificate, and forward the emails.

For the internal user's email clients to be able to encrypt the emails before sending them to the secure gateway, this device relies on the generation and distribution of proforma certificates and, preferably, on a directory proxy functionality. Proforma certificates are ad hoc certificates that are only used between one or several senders' email clients and the secure gateway in the encryption system. The email client thinks that it is using the end recipient's certificate but it is in fact using a proforma certificate. The private key corresponding to this proforma certificate is known by the secure email gateway, which can thus decrypt the outgoing emails before they are sent over the Internet, and perform virus or offensive content detection. Proforma certificates may have an unlimited validity; optionally a new proforma certificate is generated for every message, or every day, etc. In this case, the proforma certificate would be a kind of "session certificate. The secure email gateway then encrypts the outgoing email with the recipient's certificate for securing the email during its journey over the Internet. Alternatively, the recipient can also access the emails in a Web browser over a protected connection, for example a SSL connection, in which case no certificate-based encryption happens.

The directory proxy functionality allows the automatization of the sending and certificate setup process. This functionality's task is to intercept the requests for the email recipient's certificates that internal users would normally send to their company directory so that the certificates do not have to be requested manually. The request for the certificates can be forwarded to the company directory, to another directory, or can be processed using data stored in the encryption system itself. If no recipient certificate is found, either a new one is generated on the fly by the encryption system, or one is requested from the recipient. If a new certificate is generated, it is preferably a proforma one, but it can also be a normal one that will be transmitted to the recipient along with its private key.

Figure 2:
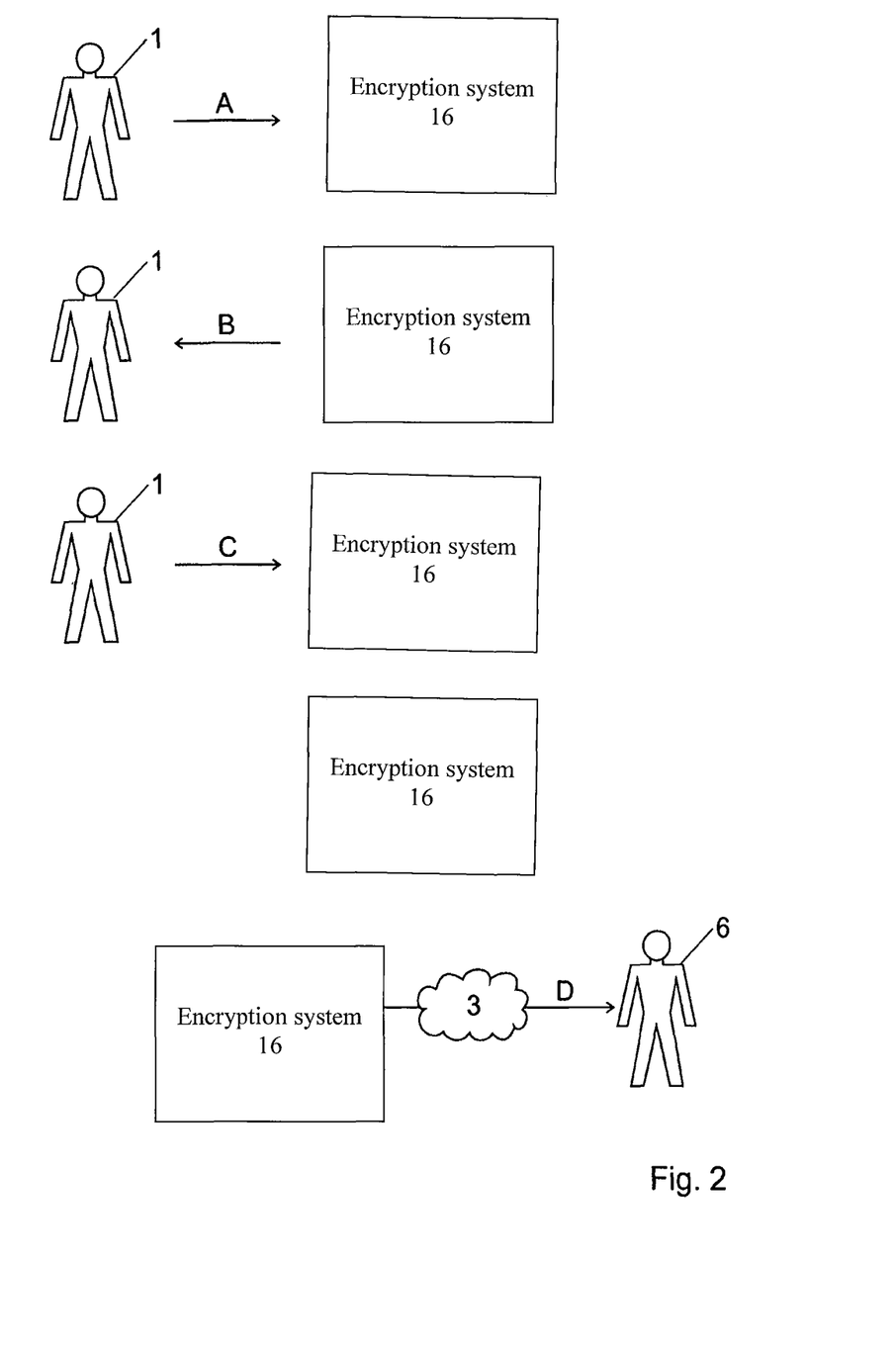
FIG. 2 is a schematic representation of the processes involved when an internal user sends an outgoing encrypted email using the method and system according to an embodiment of the invention.

The certificate setup and email sending process that take place when an internal user sends an email to a new external recipient is illustrated on FIG. 2.

During the first step of the process illustrated on FIG. 2, the internal user 1 wants to send a secure email to the recipient 6. The recipient 6 is preferably external (i.e. connected to the sender 1's private network only over the Internet 3). The internal user 1 does not have the certificate of the recipient 6 that is needed for encrypting his outgoing email, and therefore requests this certificate from the encryption system 16 (arrow A). This request can be sent manually or automatically with any conventional software as a normal request to a company directory, for example as LDAP or SQL request, and is intercepted by the encryption system. In another embodiment, the recipient certificate is requested over a web page generated by a web server in the encryption system. In yet another embodiment, a request for the recipient's certificate is automatically sent by the sender's email client when the sender sends an email that should be encrypted to a new recipient, i.e. a recipient for which no valid certificate is available. In a preferred embodiment, a directory proxy functionality allows the user request to be generated automatically when the user is sending an email to a contact from the address book.

The important event on FIG. 2 happens when the encryption system 16 receives the certificate request (arrow A) and queries a directory (not shown) for the certificate corresponding to the desired recipient. In this case, no valid certificate is available, and the encryption system thus creates a new proforma certificate that is transmitted to the internal sender (arrow B). Another option is to ask the end recipient to provide a certificate instead of generating a new proforma one; as the recipient is not likely to send his private key along with the certificate, the drawback is that it won't be possible to decrypt and re-encrypt the email on the system to check its content. A further option is to generate a normal certificate and to transmit it to the end recipient.

During the third step of FIG. 2, the sender 1 encrypts his email with the certificate he just received from the encryption system, and sends it over the encryption system to the recipient (arrow C).

During the next step of FIG. 2, the outgoing email is intercepted by the email relay or email server in the encryption system 16, and forwarded to the encryption system which decrypts it using the private key corresponding to the proforma certificate. Virus and offending content checks, spam control and statistics may thus be performed on the decrypted email.

After those checks, if confidentiality over the Internet is also required, the outgoing email is re-encrypted by the encryption system 16 during the last step of FIG. 2, using the real, final recipient's certificate, which was stored in a directory or which was previously retrieved during step 2. The encrypted email is then forwarded over the Internet 3 or over the local area network 13 to the recipient 6, as shown by arrow D.

Figure 3:
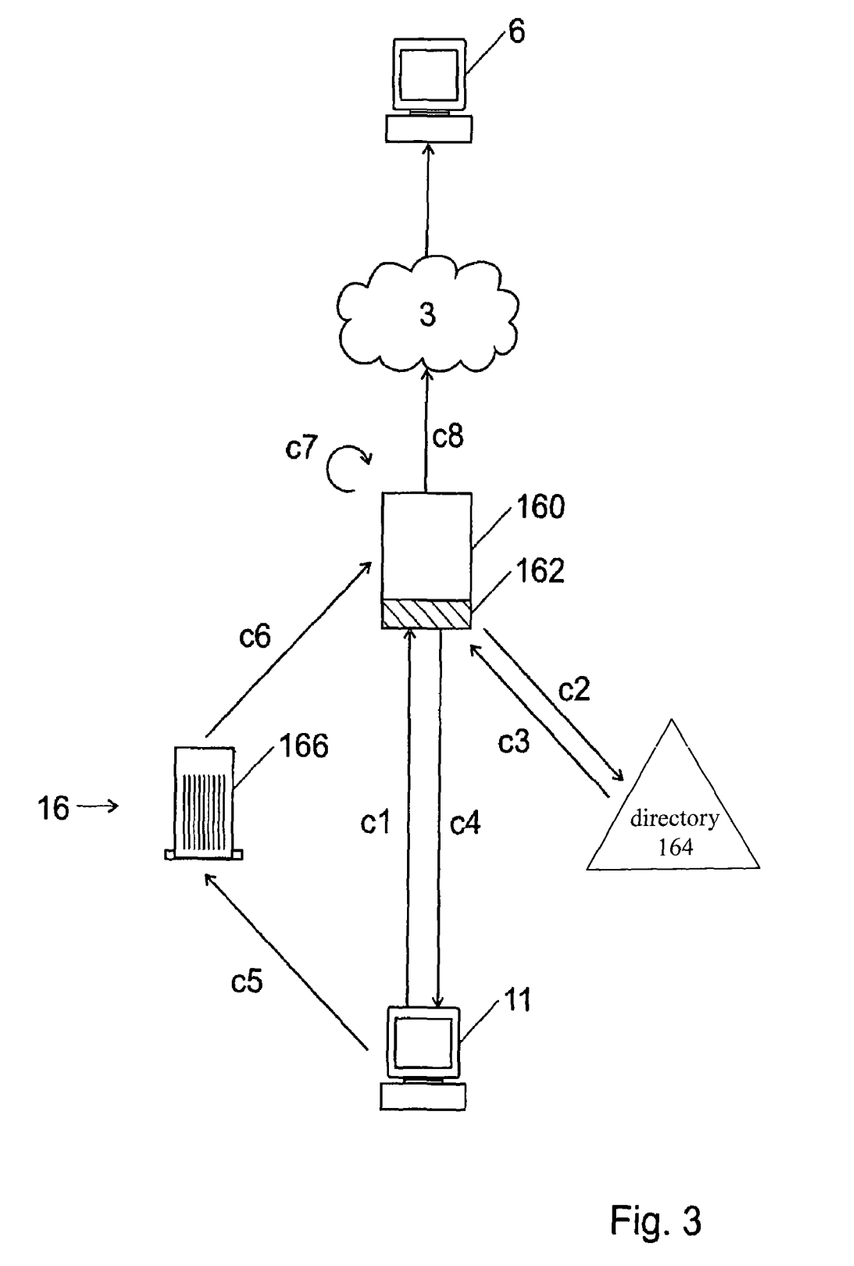
FIG. 3 is a schematic representation of a network including an encryption system with an email server, an encryption gateway and a directory according to an embodiment of the invention.

In a first embodiment illustrated by FIG. 3, the encryption system 16 comprises an encryption gateway 160 that works as an email relay performing server-side encryption and enabling encryption on both sides, before and after the encryption system. In this setup, the encryption system is used to secure the email traffic from a company that already has an email server 166 and a directory 164 that the internal email clients 11 query to get email addresses. The encryption system may comprise a conventional SMTP (Simple Email Transfer Protocol) relay, or any other kind of suitable email relay, which can easily be integrated in an existing infrastructure. The only change to the existing infrastructure components is that the existing email server 166 must forward outgoing emails to the encryption gateway 160 instead of sending them to the Internet 3 directly.

Different technologies, including but not limited to S/MIME, PGP or, for the external part, SSL can be used by the encryption gateway 160 of the invention for encrypting, signing and transmitting emails securely; the invention is not limited to a special type of encryption method. A preferred technology for the internal part of the encryption (between the internal user and the gateway 16) is however S/MIME because it is supported by most standard email clients 11. Another possibility would be to use PGP, but most email clients would require a plug-in installation for that. In addition to being able to perform encryption and decryption using the chosen technology, the encryption gateway 160 must also be able to generate the appropriate key pairs, either by itself or by using a connected PKI. S/MIME is a good choice from that point of view too since it can use known X.509 certificates as do most PKIs. The encryption gateway can use a different encryption technology for securing the Internet path and for the path through the private network. In a preferred embodiment, S/MIME is used for the internal part and a wide range of encryption technologies for the external part, in order to suit as many recipients as possible.

Figure 5:
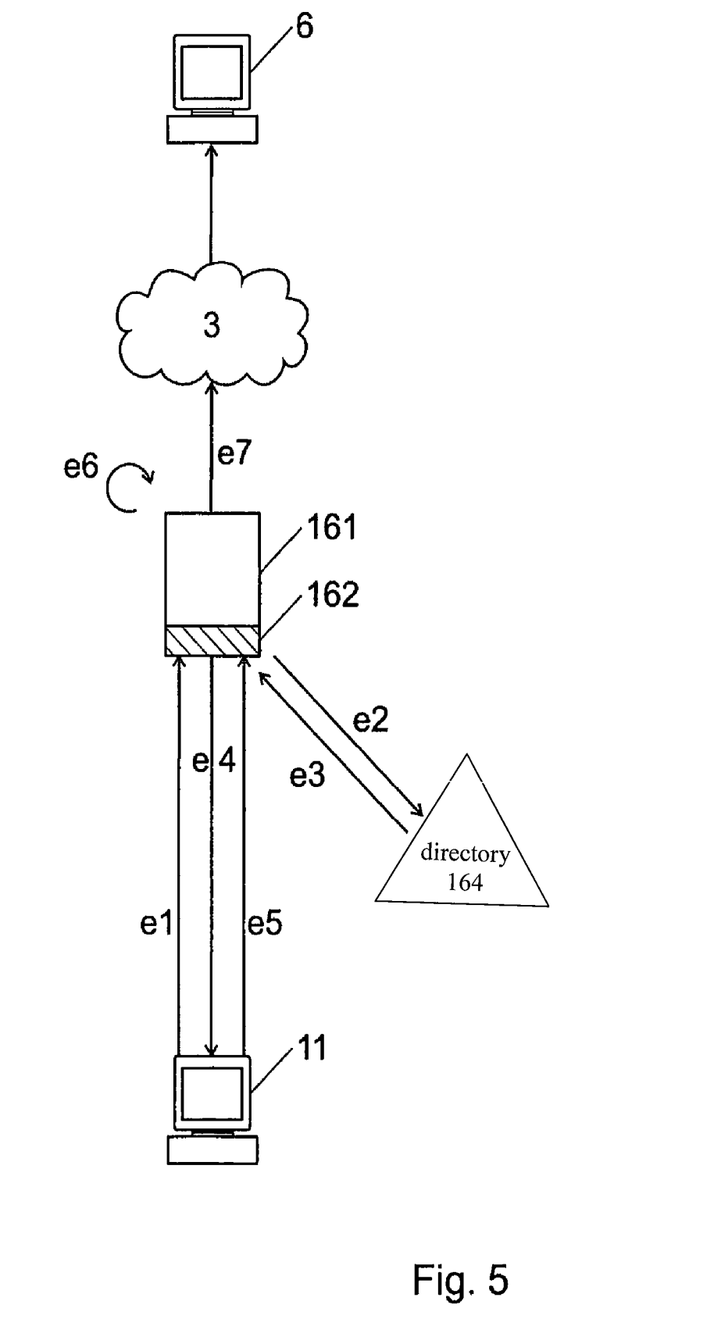
FIG. 5 is a schematic representation of a network including an encryption email server and a directory according to an embodiment of the invention.

In a various embodiment illustrated by FIG. 5, the encryption email gateway is also a standalone email server. This means that it does not need an email server to which it would relay the incoming emails and from which it would get the outgoing emails. This setup may be used to secure the email traffic from a company that does not have any email server, or that wants to take the opportunity to replace its email server.

In both embodiments of FIGS. 3 and 5, a directory proxy 162 connected to or integrated in the encryption gateway 160 waits for queries for email addresses and/or certificates coming from the internal user's email clients 11 (arrow c1). If it is a simple request for an email address, it is forwarded to the company user directory 164 (arrow c2). The response is then transmitted to the user's email client 11 (arrow c3). If a certificate is also requested, two cases arise: in the first one, the certificates are stored in the company directory or in a PKI, so the gateway searches for the appropriate certificate. In the second case, the gateway itself stores the certificates, so it looks into its certificate store. If no certificate is found, one is generated.

Once the encryption gateway 160 has all requested elements (email address, certificate, etc.), it packs them into a response whose format depends on the directory access protocol being used and sends it back to the sender's email client (arrow c4). The user's email client has no idea that the response it got did not come from a normal directory server but was constructed by a secure gateway's directory proxy functionality.

A preferred directory technology is LDAP (Lightweight Directory Access Protocol), because many email clients include a functionality to retrieve user information from LDAP directories. Most company directories are based on this protocol, so that it would usually be used between the email client and the gateway as well as between the gateway and the company directory. It is not necessary that both sides (email clients and directory) use the same protocol; in one embodiment, the encryption gateway 160, 161, 162 is able to receive requests in a first protocol, convert them into a second protocol, process the second protocol response and construct an appropriate response compliant with the first protocol.

In existing environments where user information is not stored in a directory 164, the encryption system 16 can offer directory functionality in a standalone fashion through a directory interface. It accepts directory queries (for example LDAP queries) and constructs a response by getting the appropriate data in its own data store, which is typically a relational database in the encryption gateway 160.

Internal email clients 11 thus usually do not connect directly to the company directory 164 anymore. All their queries first go through the system's directory proxy 162 instead, and it is the directory proxy that queries the company directory 164. Depending on the result of this query, a proforma certificate is generated on the fly.

The following steps take place in the system of FIG. 3 when an internal user 1 sends an email with his email client 11 to an external recipient 6 that has not yet received any secure email from the private network 13 to which the sender is connected:

c1. The email client 11 makes a manually or automatically generated query to request the email address and the certificate of the desired recipient 6, or just his certificate. The address and/or certificate can also be requested over a web page.

c2. The directory proxy 162 in the encryption system 16 forwards the directory request to the directory 164.

c3. The response from the directory 164 does not contain a certificate for the recipient, because it is the first time an internal user writes securely to the recipient 6.

c4. The encryption gateway 160 generates a proforma certificate for the recipient 6 (or retrieves a certificate generated in advance), stores the private key corresponding to this certificate, and packs the certificate in the response transmitted to the sender's email client 11. Optionally, this response may be electronically signed with the private key of the gateway 160.

c5. The sender 1 receives the proforma certificate that can be automatically installed in his email client 11, and sends the email over the company email server 166. The email is encrypted with the proforma certificate and optionally signed with the sender 11's private key.

c6. The email server 166 forwards the email to the encryption system 160, using it as an email relay.

c7. The encryption gateway 160 decrypts the email using the previously stored private key corresponding to the proforma certificate. It may also check the sender's signature, if available, using the sender's certificate which may be retrieved from the directory 164. Optionally external devices can be used at this stage to check the email content (viruses, offending content, etc.).

c8. The encryption gateway 160 encrypts the email with the recipient 6's true certificate, and transmits the email securely to the recipient. The encryption gateway 160 may also sign the email with the private key of the sender 1 or of the company. Alternatively, the content of the email is displayed to the recipient on a secured Web page, to which a link may be included in an email sent to the recipient.

Figure 4:
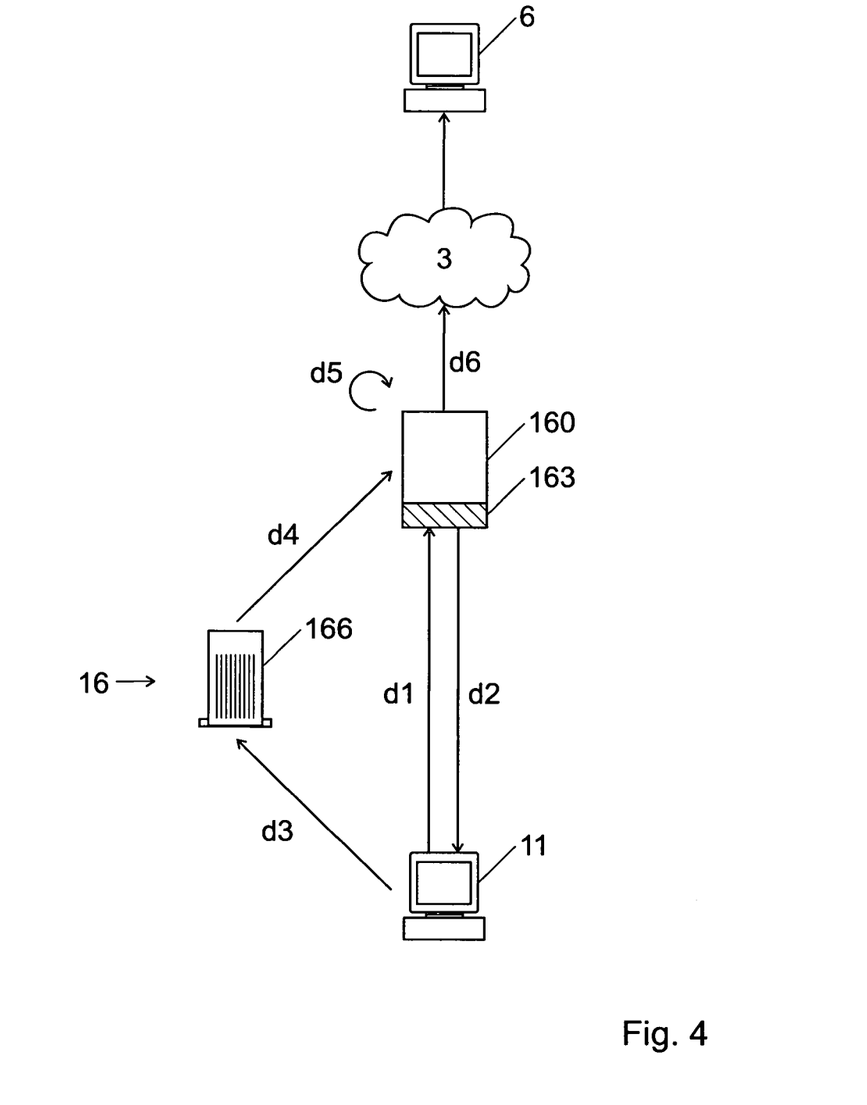
FIG. 4 is a schematic representation of a network including an encryption system with an email server and an encryption gateway according to an embodiment of the invention.

FIG. 4 describes another embodiment of the encryption system of the invention. In this setup, the encryption system is used to secure the email traffic for a company that has an email server but no directory. In this case, the full necessary directory functionality is offered by the system itself.

The following steps take place when an internal user sends an email with his email client 11 to an external recipient 6 that has not yet received any secure email from the private network 13 to which the sender is connected:

d1. The email client 11 makes a query to request an email address and a certificate of the desired recipient 6, or just his certificate.

d2. The encryption gateway 160 sends back a certificate through its directory interface 163. In that case, a proforma certificate is generated or retrieved for the recipient 6 because it is the first time somebody in the private network 13 securely writes to him. The gateway 160 stores the private key corresponding to this certificate. Optionally, the response may be electronically signed with the private key of the gateway 160.

d3. The sender 1 receives the proforma certificate that can be automatically installed in his email client 11, and sends the email over the company email server 166. The email is encrypted with the proforma certificate and optionally signed with the sender 11's private key. The system decrypts the email. Optionally, external devices can be used at this stage to check the email content (viruses, offending content, etc.).

d4. The email server 166 forwards the email to the encryption system, using it as email relay.

d5. The encryption gateway 160 decrypts the email using the previously stored private key corresponding to the proforma certificate. It may also check the sender's signature, if available, using the sender's certificate which may be retrieved from the directory 164. Optionally, external devices can be used at this stage to check the email content (viruses, offending content, etc.).

d6. The encryption gateway 160 encrypts the email with the recipient 6's true certificate and transmits the email securely to the recipient. The encryption gateway 160 may also sign the email with the private key of the sender 1 or of the company. Alternatively, the content of the email is displayed to the recipient on a secured Web page, to which a link may be included in an email sent to the recipient.

FIG. 5 describes another embodiment of the encryption system of the invention. In this setup, the encryption system comprises an email server 161 and is used to secure the email traffic from a company that has a directory 164 that the internal email clients 11 query to get email addresses and certificates.

Internal email clients 11 don't connect directly to the company directory 164 anymore. All their queries first go through the encryption system's directory proxy 162 instead, and it is the directory proxy that queries the company directory 164. Depending on the result of this query, a proforma certificate is generated on the fly.

The following steps take place when an internal user sends an email with his email client 11 to an external recipient 6 that has not yet received any secure email from the private network 13 to which the sender is connected:

e1. The email client 11 makes a query to request an email address and a certificate of the desired recipient 6, or just his certificate.

e2. The directory proxy 162 on the encryption system 16 forwards the request to the company directory 164.

e3. The response from the directory 164 does not contain a certificate for the recipient, because it is the first time somebody securely writes to him.

e4. The encryption gateway 160 generates a proforma certificate for the recipient 6 (or retrieves such a certificate), stores the private key corresponding to this certificate, and packs the certificate in the response transmitted to the sender's email client 11. Optionally, this response may be electronically signed with the private key of the gateway 160.

e5. The sender 1 receives the proforma certificate that can be automatically installed in his email client 11, and sends the email to the email server 161. The email is encrypted with the proforma certificate and optionally signed with the sender 11's private key.

e6. The encryption gateway in the email server 161 decrypts the email. It may also check the sender's signature, if available, using the sender's certificate which may be retrieved from the directory 164. Optionally, external devices can be used at this stage to check the email content (viruses, offending content, etc.).

e7. The email server 161 encrypts the email with the recipient 6's true certificate, and transmits the email securely to the recipient. The encryption gateway 160 may also sign the email with the private key of the sender 1 or of the company. Alternatively, the content of the email is displayed to the recipient on a secured Web page, to which a link may be included in an email sent to the recipient.

Figure 6:
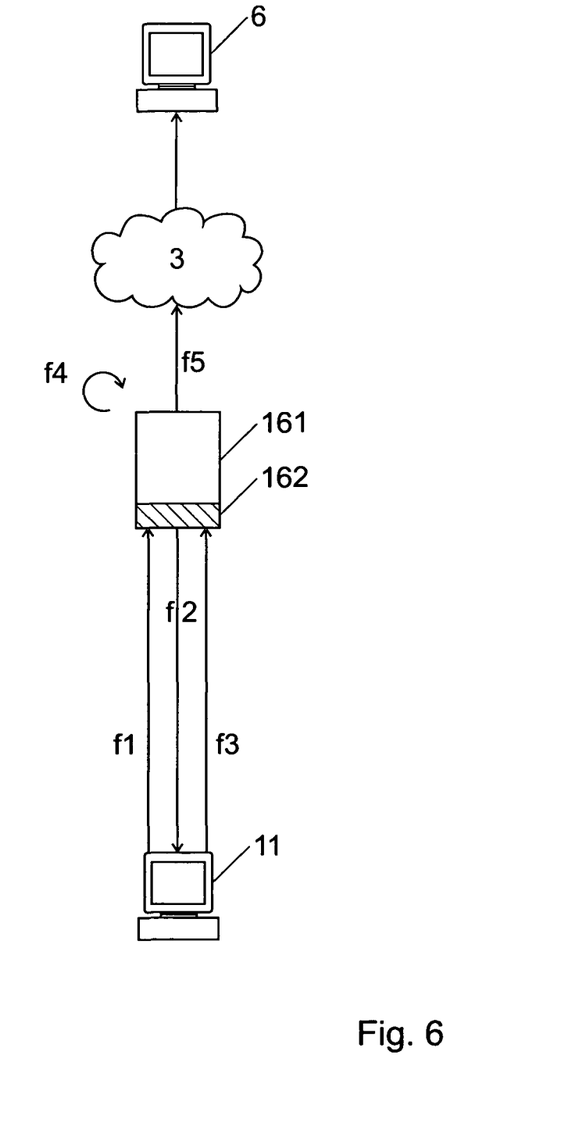
FIG. 6 is a schematic representation of a network including an encryption email server according to an embodiment of the invention.

FIG. 6 describes another embodiment of the encryption system of the invention. In this setup, the encryption system 16 is used as email server and to secure the email traffic from a company that has no user directory.

The following steps take place when an internal user sends an email with his email client 11 to an external recipient 6 that has not yet received any secure email from the private network 13 to which the sender is connected:

f1. The sender's email client 11 makes a query to request an email address and a certificate of the desired recipient 6, or just his certificate.

f2. The encryption system 161 sends back a certificate through its directory interface 162. In that case, a proforma certificate is generated or retrieved for the recipient 6 because it is the first time somebody securely writes to him. The system 161 also stores the private key corresponding to this certificate. Optionally, the response may be electronically signed with the private key of the system 161.

f3. The sender 1 receives the proforma certificate that can be automatically installed in his email client 11, and sends the email to the email server 161. The email is encrypted with the proforma certificate and optionally signed with the sender 11's private key.

f4. The encryption system 161 decrypts the email. It may also check the sender's signature, if available, using the sender's certificate which may be retrieved from the directory 164. Optionally, external devices can be used at this stage to check the email content (viruses, offending content, etc.).

f5. The email server 161 encrypts the email with the recipient 6's true certificate, and transmits the email securely to the recipient. The encryption gateway 160 may also sign the email with the private key of the sender 1 or of the company. Alternatively, the content of the email is displayed to the recipient on a secured Web page, to which a link may be included in an email sent to the recipient.

Figure 7:
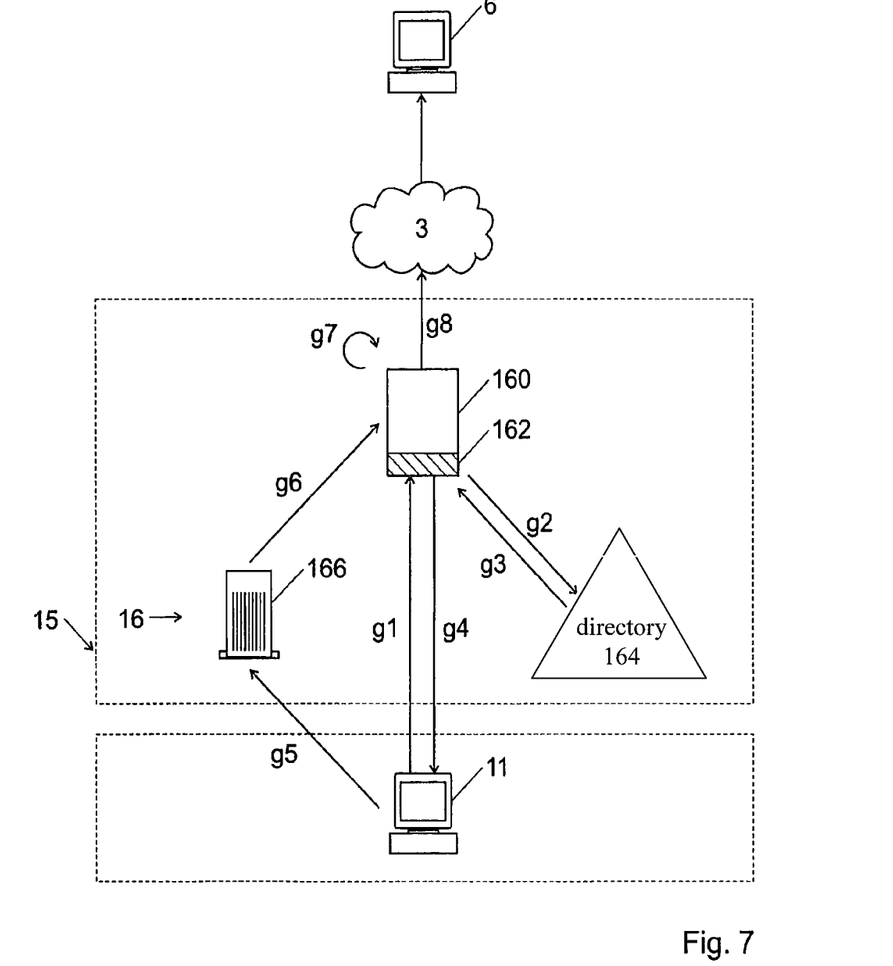
FIG. 7 is a schematic representation of a network including an encryption system with an email server, an encryption gateway and a directory hosted by the user's Internet Service provider or email provider, according to an embodiment of the invention.

FIG. 7 describes another embodiment of the encryption system of the invention. In this setup, the encryption system 16 is installed in the local network of an Internet service provider 15 and used for securing the emails forwarded from or to its customers 1. In another similar embodiment, the encryption system 16 is installed in the local network of an external email service provider, which may be different from the Internet Service Provider. In yet another embodiment, only the "secure email gateway" is outsourced and not the whole email management (in this case, on FIG. 7, the email server 166 would be in the same network as the email clients 11).

In the illustrated example of FIG. 7, email clients 11 are configured to access a directory 164 at the email service provider 15. If necessary, proforma certificates are generated on the fly and sent back. Another way would be for the senders 11 to use a local address books (either one for the whole company or one per person) and to request the new proforma certificates from the provider 15 over a web page or a special email. The proforma certificate would then be added to the local address book.

The following steps take place when a user sends an email to an external recipient:

g1. The email client 11 makes a directory query to request an email address and a certificate of the desired recipient 6, or just his certificate.

g2. The directory proxy 162 on the encryption system 16 forwards the request to the email service provider's directory 164.

g3. In that case, the response from the directory 164 does not contain a certificate for the recipient 6, because it is the first time a client of the provider 15 writes securely to the recipient 6 with the system 16.

g4. The encryption system 16 generates a proforma certificate for the recipient 6 (or retrieves such a certificate), stores the private key corresponding to this certificate, and packs the certificate in the response transmitted to the sender's email client 11. Optionally, this response may be electronically signed with a private key of the provider 15.

g5. The sender 1 receives the proforma certificate that is preferably automatically installed in his email client 11, and sends the email to the email service provider's email server 166. The email is encrypted with the proforma certificate and optionally signed with the sender 11's private key.

g6. The email server 166 forwards the email to the encryption gateway 160, using it as email relay.

g7. The encryption gateway 160 decrypts the email. Optionally, external devices can be used at this stage to check the email content (viruses, offending content, etc.). It may also check the sender's signature, if available, using the sender's certificate which may be retrieved from the directory 164.

g8. The system transmits the email to the recipient 6. The email may be encrypted with the recipient 6's true certificate. The encryption gateway 160 may also sign the email with the private key of the sender 1 or of the company. Alternatively, the content of the email is displayed to the recipient on a secured Web page, to which a link may be included in an email sent to the recipient.

Figure 8:
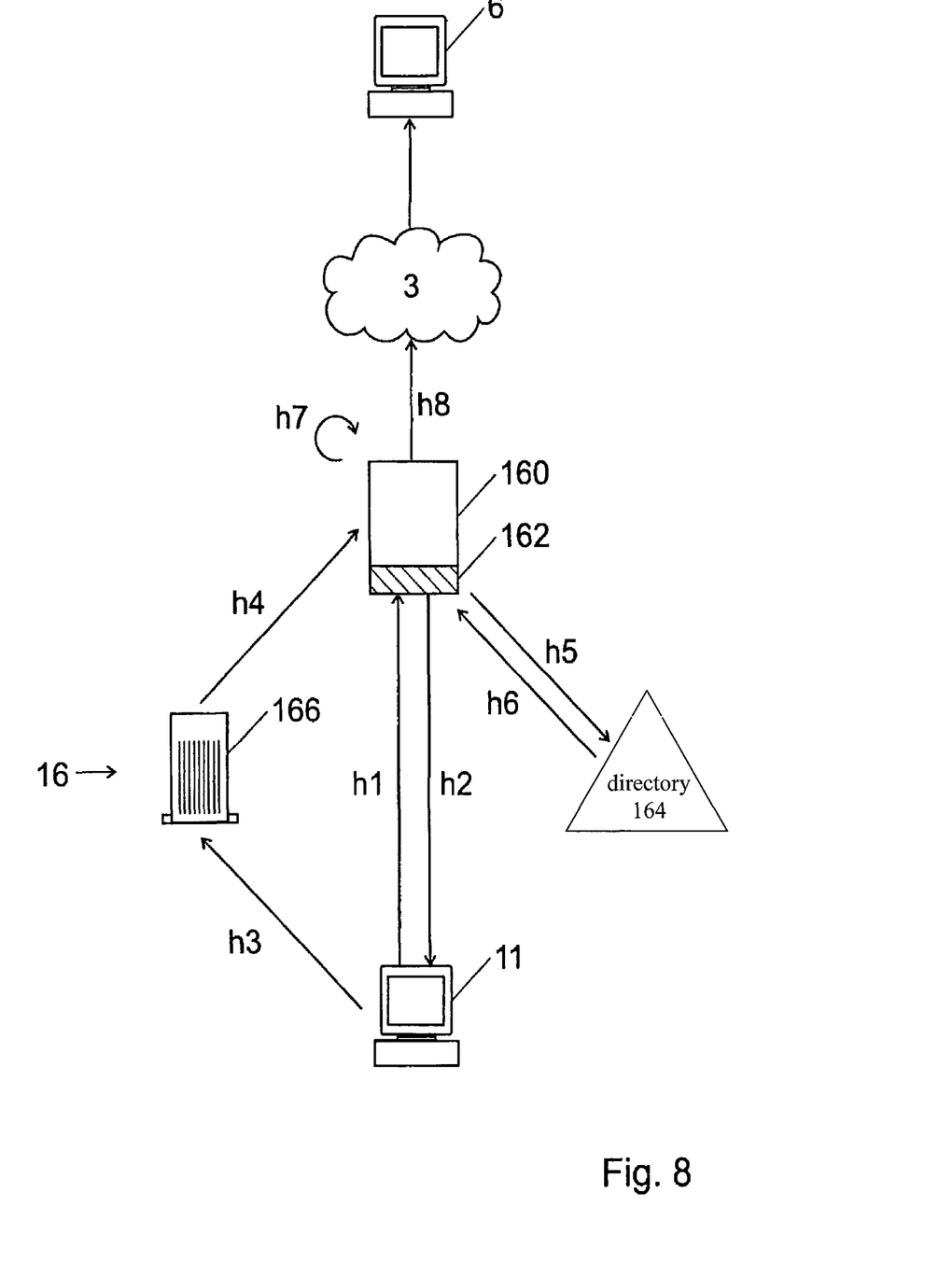
FIG. 8 is a schematic representation of a network including an encryption system with an email server, an encryption gateway and a directory according to an embodiment of the invention.

FIG. 8 describes another embodiment of the encryption system of the invention. In this setup, the encryption system 16 is used to secure the email traffic from a private network that includes an email server 166, but instead of generating a proforma certificate for each new recipient 6, the same system certificate is used to encrypt several, or even all outgoing emails. The system can also have more than one certificate, for example it is possible to use one per company department.

Internal email clients 11 do not necessarily connect directly to the company directory anymore. All their queries first go through the system's directory proxy 162 instead. The proxy 162 returns the system's email address with the address and/or name of the recipient in the name part (for example "reto.schneider@company.com"<gateway@company.com>) and the encryption system's certificate. When the sender's email client 11 then sends the encrypted email to this address, the encryption gateway 160 decrypts it and queries the company directory 164 for the email address of the recipient 6, and transmits the email.

The following steps take place when an internal user 11 sends an email to an external recipient 6:

h1. The email client 11 makes a query to the system's directory interface to request an email and a certificate for a recipient 6.

h2. The encryption system 16 sends back its own certificate and email address. The email address contains the original address in the name field.

h3. The sender 11 receives the certificate that can be automatically installed in his email client 11, and sends the email over the company email server 166 to the encryption system's address, encrypted with the system's certificate. The email may be signed with the sender 11's private key.

h4. The email server 166 forwards the email to the encryption gateway 160, using it as email relay.

h5. The encryption gateway 160 receives the email. If only the name and not the email address of the recipient is in the name field of the email, the gateway 160 requests the recipient's address from the company directory 164, using the indicated recipient's name for the query.

h6. The directory 164 sends back the requested email address.

h7. The encryption gateway 160 decrypts the email with its private key. Optionally, external devices can be used at this stage to check the email content (viruses, offending content, etc.). The sender's signature may be checked, if available. The encryption gateway changes the email's recipient address, inserting the real end-recipient address and name.

h8. The encryption gateway 160 transmits the email securely to the recipient. The email may be encrypted with the recipient 6's true certificate.

The system of FIG. 8 can also work without a company directory by storing the recipients' email addresses itself. It may also work without external email server, by acting itself as an email server.

Depending on the embodiments, the encryption system 16 of the invention may thus comprise:

Means for interfacing at least two email servers (the company email server 166 and the recipient's email server 5 outside of the company network 13) to relay emails between them, or a means for interfacing an email client 11 and an email server.

In one embodiment, the encryption system 16 works as a fully fledged email server 161, providing the complete usual email server functionality to the internal users 1 in addition to the security features.

Alternatively, the encryption system 16 works as an email relay 160 between two email servers 166, 5 or between a security device like a virus scanner and an email server.

In an embodiment, the encryption system 16 is securing the emails between an email service provider 15 (like an ISP) and his customers' email clients 11.

In an embodiment, the encryption system 16 provides a directory interface 163 through which the sender's email software requests the recipient's certificate.

In an embodiment, a Web page is provided to the sender 1 to manually request a certificate (proforma or normal) for a particular recipient 6 to be added to his personal address book.

In an embodiment, a Web page is provided to the sender 1 to request a certificate (proforma or normal) for a particular recipient to be added to the company's user directory.

In an embodiment, a Web page is provided to the network administrator to generate proforma certificates for a particular recipient 6 or group of recipients and add them to the company's directory or to the system's data store.

In an embodiment, when an internal user 1 requests a certificate, a new proforma certificate that will only be used between the sender's email client 11 and the encryption system 16 is generated or retrieved from a store.

In an embodiment, when an internal user 1 requests a certificate, the encryption system 16 asks the end recipient 6 for a certificate.

In an embodiment, when an internal user 1 requests a certificate, the encryption system 16 generates a normal certificate (public key) on-the-fly and sends it to the recipient 6 along with the corresponding private key (possibly using the PKCS#12 format). The private key generation can happen at the same time or later, typically when the recipient needs it to decrypt the message. The keys are provided to the recipient who will have to identify himself by providing some credentials (for example a password) to access the private one. If the identifying credentials are constituted by a password, it should not be transmitted by email but over an alternative channel like for example per telephone or SMS.

The keys can be provided immediately to the recipient of the email or they can be made accessible on a server. In the latter case the recipient will be able to retrieve the private key or both of them when he wants to access the content of the protected message for the first time. If the keys are sent immediately, a possible data format is PKCS#12. If they are not directly sent to the recipient but put on a server, a special file format is not necessarily needed. A typical secure user interface where the recipient can enter a password or other security credentials is enough. After having successfully identified himself, the user can download the private key over a protected connection (for example SSL/TLS). Once he has downloaded the private key, he is able to read messages that were encrypted for his email address and to digitally sign messages he writes.

In an embodiment, PKI functionality is provided to:
generate certificates for internal users;
generate certificates for recipients for the encryption between the internal senders' email clients and the encryption system 16;
generate certificates for recipients for the encryption between the encryption system 16 and the recipients' email clients;
store, revoke and renew the generated certificates.

In an embodiment, key pairs are generated in advance to speed up the certificate generation process.

In an embodiment, PKI connectivity is provided to let external PKIs generate/renew/revoke the required certificates.

In an embodiment, keys are stored by the encryption system 16.

In an embodiment, keys are stored in an external directory 164.

In an embodiment, keys are stored by an external PKI.

For some email exchanges, the same key is used for internal users between the internal users' email client and the encryption system 16 and between the encryption system 16 and the external recipient 6.

In a preferred embodiment, a first key is used for internal users between the internal users' email client 11 and the encryption system 16 and a second key is used between the encryption system 16 and the external recipient 6.

Depending on the security rules, emails can be signed and encrypted, only encrypted or only signed.

In an embodiment, the encryption system 16 comprises a directory interface 162 to an internal data store so that no external directory is needed.

In an embodiment, the system comprises a directory interface 162 to be connected to an external directory 164 and to the internal email clients.

The encryption system 16 comprises means for decrypting outgoing emails that were encrypted by the internal senders 11 with the proforma certificate of their recipient(s) and transmit them securely to the recipient(s). This can mean re-encrypting them with real public keys of the recipient(s) or letting the recipient(s) access the email through another secure way.

In an embodiment, the encryption system 16 forwards the emails to one or multiple security device(s) after decryption (virus scanners, content-security analyzers, etc.). After having been checked, the emails come back to the same device or to another one. They are then securely transmitted to their recipient 6.

The encryption system 16 preferably comprises means for decrypting incoming emails that were encrypted using another technology than the one supported by the internal user's email clients 11 and re-encrypting them using the appropriate technology.

In an embodiment, the encryption system 16 decrypts all incoming emails and forwards them to one or multiple security device(s) (virus scanners, content-security analyzers, etc.). After having being checked, the emails come back to the same device or to another one. They are then securely transmitted to the internal user 11.

In an embodiment, the encryption system 16 does not decrypt and re-encrypt all of the incoming emails, because it does not have access to the private keys of some privileged internal users.

In an embodiment, a rule engine defines which emails must be encrypted on the private network 13 (it can be useful not to encrypt all emails for performance reasons).

In an embodiment, the encryption system 16 does not have certificates for all internal users. In that case, emails sent to internal users 11 that have no certificate can be sent in clear, or a new certificate can be generated on the fly and provided to the internal user, depending on the security rules.

In an embodiment, security rules define which emails must be encrypted on the external network 3.

In an embodiment, the system periodically checks the company directory for new external users. If new users are found, proforma certificates are generated for them, so that when an internal user wants to send an email to one of them, a certificate can be provided to him directly by the company directory, without needing to go through a directory proxy functionality of the system. Optionally, rules for the certificate creation can be defined so that not all new entries in the directory receive a certificate.

In an embodiment, rules for the certificate creation can be defined so that different types of certificates, for example certificates based on different encryption techniques or certificates with different key lengths, are created for different types of recipients or for different type of messages.

A further possibility that is not described in a schema is to use the encryption system 16 without directory functionality, the sending users request the proforma certificates through a Web interface or a special email and then optionally store them in a local address book. As mentioned earlier, the use of proforma certificates is preferred but not mandatory for the encryption system, which could in some instances ask the end recipient for a certificate or to generate a normal certificate that will be sent to the recipient along with the private key.

The invention also relates to a computer product including a program for performing the encryption method when the product is loaded in the server system 16 and the program is run by said server system.

The invention claimed is:

1. Encryption method for emails sent from a sender in a private network to a recipient, comprising the following steps:
the sender requests from an encryption system in said private network of the sender a certificate corresponding to said recipient,
the encryption system returns to said sender, in response to receiving said request for the certificate corresponding to the recipient, a first, proforma certificate that is specific to said recipient, wherein the proforma certificate is generated or retrieved by the encryption system in said private network of the sender to correspond to the recipient and is to be used for encryption of said emails intended for said recipient between the sender and the encryption system,
the sender sends with the email client the outgoing email to said recipient encrypted for transmission over said private network with said first, proforma certificate, wherein the outgoing email is addressed in the email client to an email address specific to the recipient,
said email is forwarded through said encryption system to the email address specific to the recipient,
said encryption system decrypts said email using a private key corresponding to said first, proforma certificate, and
said encryption system makes the content of said email available to said recipient.

2. The method of claim 1, wherein said first, proforma certificate is generated in said encryption system.

3. The method of claim 2, wherein said encryption system requests a certificate from said recipient when said certificate of said recipient is not available, said certificate of said recipient being used for securing emails between said encryption system and said recipient.

4. The method of claim 3, wherein said encryption system sends a first email for requesting a certificate from said recipient when said certificate of said recipient is not available.

5. The method of claim 3, wherein said encryption system generates a certificate for said recipient when said recipient wants such a certificate for communicating with said sender.

6. The method of claim 1, wherein said first, proforma certificate is generated by a PKI device accessible by said encryption system.

7. The method of claim 1, wherein said encryption system encrypts said email with the certificate of said recipient before forwarding it to said recipient.

8. The method of claim 1, wherein said sender requests said certificate corresponding to said recipient by making a directory request.

9. The method of claim 1, wherein said sender requests said certificate corresponding to said recipient using a web page.

10. The method of claim 1, wherein said sender requests said certificate corresponding to said recipient using a directory interface.

11. The method of claim 1, wherein said first, proforma certificate returned by said encryption system is stored in the sender's personal address book.

12. The method of claim 1, wherein said first, proforma certificate returned by said encryption system is stored in a directory shared by several users belonging to a same community.

13. The method of claim 1, wherein said first, proforma certificate corresponding to said recipient is only used for securing emails between said sender's email client and said encryption system.

14. The method of claim 1, wherein a common proforma certificate corresponding to said recipient is used between a plurality of email clients and said encryption system.

15. The method of claim 1, wherein said encryption system makes the content of said email available to said recipient by forwarding said email to said recipient.

16. The method of claim 1, wherein said encryption system makes the content of said email available to said recipient over a secured web page.

17. The method of claim 1, wherein key pairs are generated in advance and stored in a storage available to said encryption system.

18. The method of claim 1, wherein said email is signed with the private key of said sender.

19. The method of claim 1, wherein said encryption system decrypts said outgoing email and forwards it to one of the following devices before making its content available to said recipient:
virus scanner,
content security analyzer,
spam filter,
content filter.

20. The method of claim 1, further comprising a step of receiving an incoming email in said encryption system, decrypting it in said encryption system, and encrypting it with another certificate before forwarding it to an internal user.

21. The method of claim 1, further comprising a step during which said encryption system checks a predefined set of rules to verify which emails must be decrypted, encrypted again, and/or signed.

22. The method of claim 1, wherein said encryption system comprises an email relay.

23. The method of claim 22, wherein said email relay is a SMTP relay.

24. The method of claim 1, wherein said encryption system is run by an email server to which said outgoing email is directly sent.

25. The method of claim 1, wherein said encryption system is operated by a network administrator of a local area network and returns certificates to a plurality of senders in said local area network or in a plurality of mutually connected local area networks and/or virtual private networks.

26. The method of claim 25, wherein said encryption system comprises an encryption gateway in said local area network.

27. The method of claim 25, wherein said encryption system comprises an email server and/or an email relay in said local area network.

28. The method of claim 25, wherein said encryption system comprises a directory in said local area network.

29. The method of claim 1, wherein said encryption system is operated by an Internet service provider or by an Email service provider and returns certificates for a plurality of users or clients of said service provider.

30. The method of claim 1, wherein the outgoing email is addressed only to one single email address, wherein the one single email address is the email address specific to the recipient.

31. The method of claim 1, wherein the first, proforma certificate corresponding to the recipient is used only for encrypting emails addressed to the email address of the recipient.

32. Encryption system for encrypting outgoing emails sent by a sender to an external recipient, comprising:
    means for delivering to said sender a first, proforma certificate corresponding to said recipient, wherein the first, proforma certificate is generated or retrieved by the encryption system provided to a private network of the sender in response to receiving a request for said first, proforma certificate, is specific to the recipient and is to be used for encrypting said outgoing emails for transmission between the sender and the encryption system over said private network of the sender;
    means for encrypting said emails from the sender for transmission over said private network with said first, proforma certificate, wherein the emails encrypted with said first, proforma certificate are addressed to an email address specific to the recipient corresponding to said first, proforma certificate;
    means for decrypting encrypted emails sent from said sender within the private network with a private key corresponding to said first, proforma certificate specific to the recipient, and
    means for making the content of said encrypted emails available to said recipient.

33. The encryption system of claim 32, including an email relay.

34. The encryption system of claim 32, including an email server.

35. The encryption system of claim 32, including a directory of recipient addresses.

36. The encryption system of claim 35, said directory being a LDAP directory.

37. The encryption system of claim 35, said directory including the certificates of at least a plurality of recipients, said encryption systems including encryption means for encrypting said emails with said certificates and forwarding means for forwarding said encrypted emails to said recipient.

38. A non-transitory computer-readable recording medium having an executable program that can be loaded into and executed by a server system for performing the method of one of the claims 1 to 29.

* * * * *

UNITED STATES PATENT AND TRADEMARK OFFICE
CERTIFICATE OF CORRECTION

PATENT NO. : 8,726,026 B2  
APPLICATION NO. : 10/991678  
DATED : May 13, 2014  
INVENTOR(S) : Marcel Mock and Olivier Swedor Page 1 of 1

It is certified that error appears in the above-identified patent and that said Letters Patent is hereby corrected as shown below:

On the Title Page, column one, item (73) Assignee, please replace "Kushnacht" with - Kusnacht -

Signed and Sealed this  
Ninth Day of September, 2014

Michelle K. Lee  
*Deputy Director of the United States Patent and Trademark Office*